United States Patent
Share et al.

(10) Patent No.: US 10,232,593 B2
(45) Date of Patent: Mar. 19, 2019

(54) OXYGEN-SCAVENGING COMPOSITION AND ARTICLES THEREOF

(71) Applicant: Valspar Sourcing, Inc., Minneapolis, MN (US)

(72) Inventors: Paul Share, Ann Arbor, MI (US); Richard H. Evans, Wexford, PA (US)

(73) Assignee: THE SHERWIN-WILLIAMS COMPANY, Cleveland, OH (US)

(*) Notice: Subject to any disclaimer, the term of this patent is extended or adjusted under 35 U.S.C. 154(b) by 650 days.

(21) Appl. No.: 13/799,515

(22) Filed: Mar. 13, 2013

(65) Prior Publication Data

US 2014/0262917 A1    Sep. 18, 2014

(51) Int. Cl.

| | |
|---|---|
| *C09K 15/06* | (2006.01) |
| *B32B 27/00* | (2006.01) |
| *B32B 27/06* | (2006.01) |
| *B32B 27/08* | (2006.01) |
| *B32B 27/10* | (2006.01) |
| *B32B 27/18* | (2006.01) |
| *B32B 27/32* | (2006.01) |
| *B32B 27/36* | (2006.01) |
| *B01D 53/02* | (2006.01) |

(52) U.S. Cl.
CPC .............. *B32B 27/00* (2013.01); *B32B 27/06* (2013.01); *B32B 27/08* (2013.01); *B32B 27/10* (2013.01); *B32B 27/18* (2013.01); *B32B 27/32* (2013.01); *B32B 27/36* (2013.01); *B01D 53/02* (2013.01); *B01D 2253/202* (2013.01); *B01D 2253/25* (2013.01); *B01D 2257/104* (2013.01); *B32B 2307/74* (2013.01); *B32B 2439/70* (2013.01)

(58) Field of Classification Search
None
See application file for complete search history.

(56) References Cited

U.S. PATENT DOCUMENTS

| | | | |
|---|---|---|---|
| 1,969,709 A | 8/1934 | Bruson et al. | |
| 3,109,829 A * | 11/1963 | Bown | C08K 5/13 524/304 |
| 4,075,143 A | 2/1978 | Schelhaas et al. | |

(Continued)

FOREIGN PATENT DOCUMENTS

| | | |
|---|---|---|
| EP | 1553137 | 7/2005 |
| EP | 1666925 | 6/2006 |

(Continued)

OTHER PUBLICATIONS

Sigma-Aldrich, 4,4'-Diaminodiphenylmethane, Sigma-Aldrich Co., LLC, 2015, pp. 1-3, http://www.sigmaaldrich.com/catalog/product/aldrich/32950?lang=en&region=US.*

(Continued)

*Primary Examiner* — Callie E Shosho
*Assistant Examiner* — Patrick N English
(74) *Attorney, Agent, or Firm* — Shumaker & Sieffert, P.A.

(57) ABSTRACT

An oxygen-scavenging composition is provided that includes an oxygen-scavenging component and an oxidation catalyst. In preferred embodiments, the oxygen-scavenging composition includes a thermoplastic polymer that may optionally include the oxygen-scavenging composition as a portion thereof. In preferred embodiments, the composition is suitable for use in packaging articles.

11 Claims, 3 Drawing Sheets

(56) References Cited

U.S. PATENT DOCUMENTS

| | | |
|---|---|---|
| 4,908,151 A | 3/1990 | Inoue et al. |
| 5,021,515 A | 6/1991 | Cochran et al. |
| 5,211,875 A | 5/1993 | Speer et al. |
| 5,310,497 A | 5/1994 | Ve Speer et al. |
| 5,324,350 A | 6/1994 | Bender et al. |
| 5,346,644 A | 9/1994 | Speer et al. |
| 5,350,622 A | 9/1994 | Speer et al. |
| 5,399,289 A | 3/1995 | Speer et al. |
| 5,418,301 A | 5/1995 | Hult et al. |
| 5,514,764 A | 5/1996 | Frechet et al. |
| 5,587,446 A | 12/1996 | Frechet et al. |
| 5,639,815 A | 6/1997 | Cochran et al. |
| 5,663,260 A | 9/1997 | Frechet et al. |
| 5,700,554 A | 12/1997 | Speer et al. |
| 6,020,457 A | 2/2000 | Klimash et al. |
| 6,083,585 A | 7/2000 | Cahill et al. |
| 6,114,489 A | 9/2000 | Vicari et al. |
| 6,225,404 B1 | 5/2001 | Sorensen et al. |
| 6,254,804 B1 | 7/2001 | Matthews et al. |
| 6,255,248 B1 | 7/2001 | Bansleben et al. |
| 6,323,288 B1 * | 11/2001 | Ching ............... C08F 8/00 525/330.6 |
| 6,410,156 B1 | 6/2002 | Akkapeddi et al. |
| 6,515,067 B2 | 2/2003 | Cai et al. |
| 6,525,123 B1 | 2/2003 | Yang et al. |
| 6,525,170 B1 | 2/2003 | Wang |
| 6,559,205 B2 | 5/2003 | Cai et al. |
| 6,617,418 B1 | 9/2003 | Magnusson et al. |
| 6,673,870 B2 | 1/2004 | Owens et al. |
| 6,733,851 B2 | 5/2004 | Ferri |
| 6,777,496 B2 | 8/2004 | Patel et al. |
| 6,818,151 B2 | 11/2004 | Yang et al. |
| 6,878,774 B2 | 4/2005 | Kikuchi et al. |
| 6,933,055 B2 | 8/2005 | Share et al. |
| 6,946,175 B2 | 9/2005 | Yang et al. |
| 7,091,308 B2 | 8/2006 | Haggman et al. |
| 7,166,657 B2 | 1/2007 | Rao et al. |
| 7,238,300 B2 | 7/2007 | Solis et al. |
| 7,247,390 B1 | 7/2007 | Yang et al. |
| 7,390,569 B2 | 6/2008 | Kitano et al. |
| 8,318,836 B2 | 11/2012 | Hage et al. |
| 2002/0072476 A1 | 6/2002 | Yoshida et al. |
| 2002/0153511 A1 | 10/2002 | Cotterman et al. |
| 2003/0036486 A1 | 2/2003 | Kodali |
| 2003/0218152 A1 | 11/2003 | Yang et al. |
| 2005/0085577 A1 | 4/2005 | Ching et al. |
| 2005/0104033 A1 | 5/2005 | Schmidt et al. |
| 2006/0014848 A1 | 1/2006 | Loccufier et al. |
| 2006/0052510 A1 | 3/2006 | Haggman et al. |
| 2006/0099232 A1 | 5/2006 | Matsunami |
| 2006/0122306 A1 | 6/2006 | Stafford et al. |
| 2006/0148957 A1 | 7/2006 | Stewart et al. |
| 2006/0202161 A1 | 9/2006 | Share et al. |
| 2006/0211811 A1 | 9/2006 | Goto et al. |
| 2006/0241194 A1 | 10/2006 | Cha et al. |
| 2006/0276368 A1 | 12/2006 | Speer et al. |
| 2007/0014754 A1 | 1/2007 | Denkewicz, Jr. et al. |
| 2007/0027269 A1 | 2/2007 | Stumbe et al. |
| 2008/0090042 A1 | 4/2008 | Kitahara |
| 2009/0014687 A1 | 1/2009 | Kaskel et al. |
| 2010/0051862 A1 | 3/2010 | Share et al. |

FOREIGN PATENT DOCUMENTS

| | | | |
|---|---|---|---|
| JP | 2001040226 | 2/2001 | |
| JP | 2001042115 | 2/2001 | |
| JP | 2001072115 | 3/2001 | |
| JP | 2004063810 | 2/2004 | |
| JP | 2005008699 | 1/2005 | |
| JP | 2006206744 | 8/2006 | |
| WO | 2005037925 | 4/2005 | |
| WO | 2006125965 | 11/2006 | |
| WO | WO 2011067198 A1 * | 6/2011 | ............. B32B 27/18 |

OTHER PUBLICATIONS

International Search Report and Written Opinion for counterpart application PCT/US2008/073839 dated Nov. 3, 2008 (7 pages).

Perstorp brochure on boltorn.rtm. Dendritic Polymers (12 pages).

Lange, J., et al., Barrier Coatings for Flexible Packaging based on Hyperbranched Resins, Polymer 42 (2001) 7403-7410, published by Elsevier Science Ltd. in 2001 (8 pages).

* cited by examiner

OXYGEN-SCAVENGING COMPOSITION AND ARTICLES THEREOF

TECHNICAL FIELD

This invention relates to an oxygen-scavenging composition. The oxygen-scavenging composition may be applied to, or incorporated into, an article such as, for example, a packaging article to preserve the freshness of packaged products such as, for example, foods and beverages.

BACKGROUND

Historically, oxygen-sensitive products have been packaged and shipped in either glass or metal containers for delivery to the consumer. These containers have essentially zero gas permeability and, as such, the oxygen-sensitive products are able to remain fresh for an extended period of time.

There is a growing desire to package certain products such as, for example, foods and beverage products, in various plastic (e.g., PET, HDPE, PP, etc.) containers, wrapping, and other packaging articles. Compared to glass or metal packaging, plastic packaging is typically cheaper, more resistant to breakage, and can be more flexible if desired. Conventional plastics, however, have generally functioned poorly at blocking oxygen passage relative to other available materials, such as glass or metal. The permeability of conventional plastics to oxygen transmission can result in short product shelf life, especially for products that are sensitive to degradation when exposed to oxygen.

Oxygen-scavenging materials have been incorporated into plastic containers in an attempt to maintain a low level of oxygen within the container, thereby extending the shelf life of the product. These plastic containers, however, have typically suffered from one or more deficiencies such as loss of adhesion, delamination, presence of off tastes or odors in products packaged therein, poor clarity, cost (e.g., material, storage, and/or transportation costs), insufficient oxygen-scavenging capacity and/or shelf life, and inefficient or untimely activation of oxygen scavenging. Thus, there is a continuing need for improved oxygen-scavenging materials for use in packaging articles.

SUMMARY

The present invention provides a composition capable of scavenging oxygen that is suitable for use in a multitude of applications. In preferred embodiments, the composition may be used in packaging articles to impart oxygen-scavenging properties.

In one embodiment, the present invention provides an oxygen scavenging composition that includes an oxygen-scavenging component and preferably also includes at least one, and more preferably both, of an oxidation catalyst and a thermoplastic polymer. The oxygen-scavenging component may be present in the composition in any suitable form, including, for example, as a relatively low-molecular-weight additive, a portion of an oligomer, and/or a portion of the thermoplastic polymer. The oxygen-scavenging component preferably includes an aromatic ring, a —$CH(R^1)_2$ group attached to a first atom of the aromatic ring (where each $R^1$ is independently a hydrogen atom, a halogen atom, a hydroxyl group, a mercaptan group, an organic group, or any other suitable substituent group), and an electron-donating group attached to a second atom of the aromatic ring, which is preferably configured to activate the —$CH(R^1)_2$ group for purposes of oxygen-scavenging.

In another embodiment, the present invention provides an article that includes a layer of an oxygen-scavenging composition described herein. The article may be either a single-layer article or a multi-layer article. In some such embodiments, the article is a packaging article such as, for example, a bottle, cup, bowl, container, film, wrap, liner, coating, tray, carton or bag. In yet another embodiment, the present invention provides a method of making an article that comprises forming an article (e.g., a packaging article) that includes a layer incorporating an oxygen-scavenging composition described herein.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description, the drawings, and from the claims.

SELECTED DEFINITIONS

Unless otherwise specified, the following terms as used herein have the meanings provided below.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups).

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the recitation of a particular "group" is intended to be a specific recitation of both the particular moiety, as well as a recitation of the broader class of substituted and unsubstituted structures that includes the moiety.

The term "aromatic" as used herein refers to a closed aromatic ring or ring systems such as phenyl, naphthyl, biphenyl, fluorenyl, indenyl, and so on, as well as heteroaryl groups (i.e., a closed ring hydrocarbon in which one or more of the atoms in the ring is an element other than carbon (e.g., nitrogen, oxygen, sulfur, etc.)). Examples of heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on.

The term "double bond" is non-limiting and refers to any type of double bond between any suitable atoms (e.g., C, O, N, etc.).

The term "heteroatom" refers to an atom other than carbon or hydrogen.

The term "oxygen scavenging" means absorbing, consuming or reducing the amount of oxygen from a given environment.

The term "packaging article" as used herein includes both packaging articles in their final commercial form, as well as any intermediate stages. Preforms, which are frequently formed for plastic containers and other packaging articles, are one example of such an intermediate stage. The term includes at least films, bottles, containers, closures, closure liners, etc.

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present invention is directed to an oxygen-scavenging (OS) composition that preferably includes an oxygen-scavenging component and an oxidation catalyst, where the catalyst is preferably capable of enhancing oxygen scavenging of the OS composition. As discussed below, the oxygen-scavenging component of the OS composition preferably includes an aromatic ring, a —$CH(R^1)_2$ group attached to the aromatic ring, and an electron-donating group also attached to the aromatic ring, where the electron-donating group is configured to activate the —$CH(R^1)_2$ group with the oxidation catalyst to facilitate an oxygen-scavenging reaction.

Figure 1:
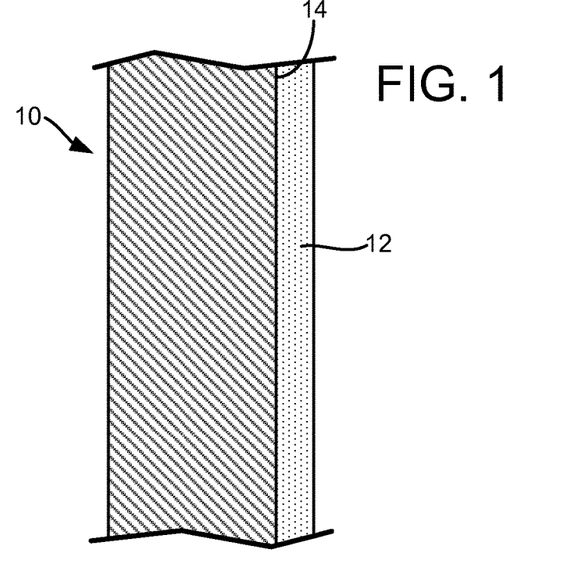
FIG. 1 is a side sectional view of a layer of an oxygen-scavenging composition of the present invention disposed on an article surface of a multi-layer article.
Figure 2:
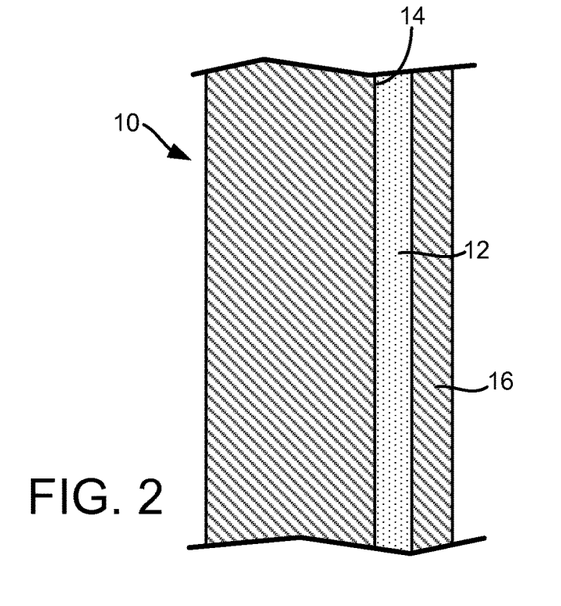
FIG. 2 is a side sectional view of a layer of the oxygen-scavenging composition disposed on an article surface of a multi-layer article that also includes one or more outer layers.
Figure 3:
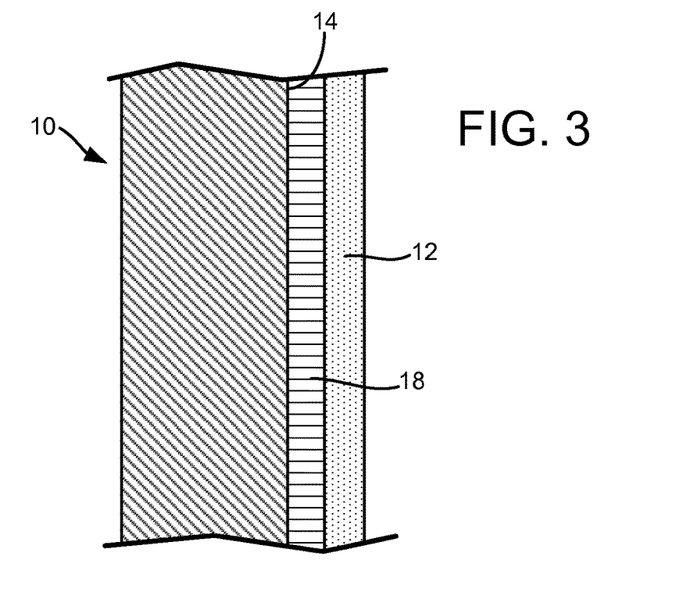
FIG. 3 is a side sectional view of a layer of the oxygen-scavenging composition disposed on an article surface of a multi-layer article that also includes one or more intermediate layers.
Figure 4:
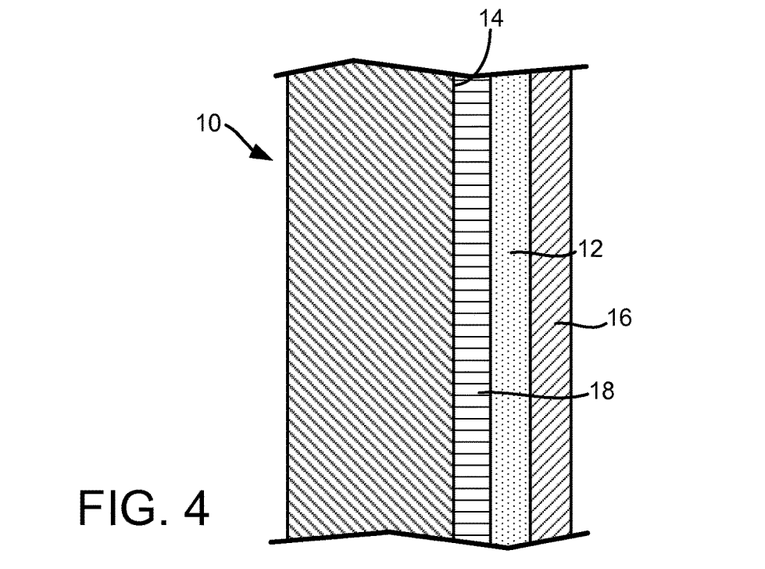
FIG. 4 is a side sectional view of a layer of the oxygen-scavenging composition disposed on an article surface of a multi-layer article that also includes one or more outer and intermediate layers.

As shown in FIG. 1, in some embodiments, the OS composition may be applied to an article, such as article 10, where OS composition may be used to form a layer 12 on a surface 14 of article 10. In these embodiments, the OS composition also preferably includes a thermoplastic or base polymer to impart one or more desired mechanical properties to the OS composition and layer 12. In some of these embodiments, the oxygen-scavenging component may be present in the thermoplastic polymer itself. As shown in FIGS. 2-4, article 10 may also have one or more outer layers 16 and/or one or more intermediate layers 18 relative to layer 12.

Examples of suitable articles for article 10 may include packaging articles such as flexible or rigid articles for packaging oxygen-sensitive products such as oxygen-sensitive food or beverage products (e.g., fruit juices, wine, beer, meat, etc.), medical or pharmaceutical products, computer parts, electronic or electrical parts, or other materials sensitive to oxygen (e.g., corrodible metals). In these embodiments, surface 14 may be any suitable surface of the article 10, such as an inner packaging surface, for example. It is further contemplated that the OS composition may be used in non-packaging applications where oxygen-scavenging properties are desired.

As mentioned above, the oxygen-scavenging component of the OS composition preferably includes an aromatic ring, a —$CH(R^1)_2$ group, and an electron-donating group, where the —$CH(R^1)_2$ group and the electron-donating group may each be substituent groups of the aromatic ring. The aromatic ring may be of any suitable ring-size, and may include any suitable additional substituent groups, such as heteroatoms (e.g., nitrogen, oxygen, phosphorus, or sulfur) or heteroatom-containing groups attached directly to an atom of the aromatic ring. In a presently preferred embodiment, the aromatic ring is a six-member ring, more preferably a six-member carbon aromatic ring. In some embodiments, the oxygen-scavenging component may include two or more aromatic rings, two or more —CH(R¹)₂ groups, and two or more electron-donating groups.

The —CH(R¹)₂ group itself is preferably attached to a first carbon atom of the aromatic ring, such as a carbon atom participating in a conjugated carbon-carbon double bond of the aromatic ring. R¹ can be any suitable atom or group. In preferred embodiments, each R¹ unit is independently selected from a hydrogen atom, a halogen atom, a hydroxyl group, a mercaptan group, or an organic group. Suitable organic groups of the R¹ unit may have any suitable size and constituents (e.g., substituted or unsubstituted hydrocarbon groups such as substituted or unsubstituted alkyl group, a substituted or unsubstituted cycloalkyl group, a substituted or unsubstituted aryl group, a substituted or unsubstituted alkenyl or alkynyl group, and the like), where the R¹ unit can optionally both be constituents of a same cyclic group.

In some embodiments, one or both R¹ units are hydrogen atoms, and —CH(R¹)₂ may be a methyl group. In other embodiments, one or both R¹ units are an organic group, more preferably a substituted or unsubstituted hydrocarbon group such as, for example, those described above. Suitable such organic groups of the R¹ units may have any suitable molecular weight. In some embodiments, the organic groups of the R¹ units have an atomic weight of less than about 1,000, less than 500, less than 200, less than 100, or less than 50 Daltons. In other embodiments, the organic group of the R¹ units may have an atomic weight of greater than about 1,000 Daltons.

The OS composition can contain any suitable number of the aforementioned —CH(R¹)₂ substituent groups. A sufficient number of —CH(R¹)₂ groups are preferably included to provide suitable oxygen-scavenging properties. The number of —CH(R¹)₂ groups included may vary depending on a variety of considerations, including, for example, the intended application (e.g., the level of oxygen-scavenging capacity and/or rate desired, including, for example, the level of "initial" oxygen scavenging upon product packaging, the thickness of an article or layer in which the oxygen-scavenging composition is to be employed, the desired concentration of oxygen-scavenging component in an article or composition, etc.) and the amount and efficacy of other types of oxygen-scavenging groups present in the OS composition.

The electron-donating group is preferably positioned relative to the —CH(R¹)₂ group to activate the —CH(R¹)₂ group. Examples of suitable electron-donating groups are provided later herein. While not wishing to be bound by any theory, it is believed that the presence of an electron-donating group attached to the aromatic ring at a suitable position relative to the —CH(R¹)₂ group can activate the —CH(R¹)₂ group for purposes of participating in an oxygen-scavenging reaction. Relative to the ring atom to which the —CH(R¹)₂ group is attached, the electron-donating group is preferably attached to an atom of the aromatic ring that is at the ortho (1,2) position (i.e. immediately adjacent) or the para (1,4) position, and especially when the aromatic group is a six-member carbon ring as illustrated by Formulas 1 and 2:

Formula 1

(1,2 ortho position)

Formula 2

(1,4 para position)

where "EDG" refers to the electron-donating group.

While not wishing to be bound by any theory, it is believed that electron-donating groups positioned at the ortho or para position have the most effect in "activating" the —CH(R¹)₂ group due to resonance. In some embodiments, the electron-donating group may be attached to a second aromatic ring that forms a fused polycylic (e.g., bicyclic) group with the first aromatic ring to which the —CH(R¹)₂ group is attached. An example of such a fused polycyclic group is a naphthalene-type group.

Suitable electron-donating groups include any suitable groups (e.g., heteroatom-containing groups) that function as activating π donors or σ donors. Examples of preferred electron-donating groups include those that function as activating π donors, such as amine groups (—NH₂, —NHR, and —NR₂), hydroxyl groups (—OH), ether groups (—OR), —NHCOCH₃ groups, and the like, where each "R" is preferably an alkyl group. In some embodiments, the aromatic ring(s) preferably do not include any unsuitable electron-withdrawing groups attached to the aromatic ring, particularly at a 1,3 meta position relative to the —CH(R¹)₂ group.

The oxygen-scavenging component may be either a polymer or a non-polymer component. Thus, for example, the oxygen-scavenging component may be added as a relatively low molecular weight additive (e.g., having a number average molecular weight of less than about 500, or less than about 300), or may be present as a structural unit of an oligomer or a polymer. Examples of such oxygen-scavenging components for use in the OS composition include materials having the following structure of Formula 3:

Formula 3 where each R¹ is independently as previously described above; each R² is independently a hydrogen atom, a halogen atom, a hydroxyl group, or an organic group; each EDG denotes an electron-donating group as previously described above; and n is 1 or more, more preferably 1 to 3, even more preferably 1 or 2; where R² may join with one or more other R² or one EDG to form a cyclic group; and where two or more EDG may join to form a cyclic group. In some embodiments, each R² is a hydrogen atom.

Some examples of suitable oxygen-scavenging components are provided below in Formulas 4-7.

Formula 4

Formula 5

Formula 6

Formula 7

Formula 4 depicts Troger's base, which is a preferred oxygen-scavenging component for use in the OS composition. In this case, oxygen-scavenging component includes two linked aromatic groups, two —CH(R$^1$)$_2$ groups (i.e., two —CH$_3$ methyl groups), and two electron-donating amine groups at the 1,4 para positions. Formulas 5 and 6 respectively depict 1-(4-methylphenyl) piperazine and N,N-bis(2-hydroxyethyl-p-toluidine), each of which include a single aromatic group, a single —CH(R$^1$)$_2$ group (i.e., a —CH$_3$ methyl group), and a single electron-donating amine group at the 1,4 para position. Formula 7 depicts 4-methoxyphenethyl alcohol, which includes a single aromatic group, a hydroxyl-based —CH(R$^1$)$_2$ group (i.e., a —CH$_2$CH$_2$OH group), and an electron-donating ether group at the 1,4 para position.

It was a surprising and unexpected finding that each of the above compounds were observed to scavenge oxygen when combined with a suitable oxidation catalyst. While not wishing to be bound by any theory, it is believed that a —CH(R$^1$)$_2$ group in each of these compounds is responsible, at least in part, for the scavenging of oxygen. For example, infrared (IR) spectroscopy analysis of the Troger's base compound (Formula 4) after oxygen-scavenging indicated the conversion of methyl groups to aldehyde groups, thereby indicating the occurrence of oxidation at the methyl group.

As previously discussed, oxygen-scavenging components such as the above non-limiting examples can be added to the OS composition or may be incorporated into another material of the composition such as, for example, one or more thermoplastic or base polymers of the OS composition. The oxygen-scavenging component can be incorporated into a polymer using any suitable reaction method, including for example: (i) forming the thermoplastic or base polymer from a polymer precursor (e.g., a monomer or an oligomer) that contains the oxygen-scavenging component, (ii) providing a preformed thermoplastic or base polymer and then modifying the preformed thermoplastic polymer to contain the oxygen-scavenging component, or (iii) combining the oxygen-scavenging component with reactants for forming the polymer and reacting the combined reactants to form the polymer including the oxygen-scavenging component.

When present in the optional polymer, the oxygen-scavenging component may be present in any suitable location, including, for example, in a backbone of the polymer or a pendant group of the polymer. If desired, the polymer may include both one or more backbone groups and one or more pendant groups that include an oxygen-scavenging component of the present invention. In preferred embodiments, the polymer has a number average molecular weight of at least 1,000, more preferably at least 2,000, and even more preferably at least 5,000. Typically, the number average molecular weight of the polymer is less than about 100,000, more preferably less than 50,000, and even more preferably less than 35,000.

Examples of suitable optional polymers for incorporating the oxygen-scavenging component include polyesters and copolyesters such as polyethylene terephthalate ("PET"), polybutylene terephthalate ("PBT"), polyethylene naphthalate ("PEN"), polybutylene naphthalate ("PBN") and any other suitable esters of acids and diols; polylactones such as polycaprolactone; polymethyl methacrylate ("PMMA"); styrene/maleic anhydride ("SMA"); polyoxymethylene ("POM"); ketones such as polyetheretherketone ("PEEK") and polyaryletherketone ("PAEK"); thermoplastic fluoropolymers; polycarbonate ("PC"); polyurethanes; polyarylate ("PAR"); polyphenylene oxide ("PPO"); polyamides such as nylon 6, nylon 6,6, nylon 11, nylon 6,12 and nylon 12; imides such as polyimide ("PT"), polyetherimide ("PEI") and polyamideimide ("PAI"); polyphthalamide; sulfones such as polysulfone ("PSul"); polyarylsulfone ("PAS") and poly ether sulfone ("PES"); polyaminoacids; polydimethylsiloxanes; polyolefins such as polyethylene ("PE"), polypropylene ("PP"), polybutylene ("PB"), and polybutadiene ("PBD"); styrenes such as polystyrene ("PS"), poly α-methyl styrene and styrene/acrylonitrile ("SAN"); vinyls such as polyvinyl chloride ("PVC") and polyvinylnaphthalene ("PVN"); mixtures thereof; and copolymers and derivatives thereof which preferably do not unsuitably interfere with oxygen scavenging. If desired, the composition may include blends of any suitable combination of two or more of the above polymers.

In certain preferred embodiments, the polymer is a thermoplastic polymer that can be mechanically shaped (e.g., into a three-dimensional article) by processes such as, for example, injection molding, extrusion, pressing, casting, rolling, or molding. In certain preferred embodiments, the polymer is suitable for contacting food or beverage products. In a presently preferred embodiment, the polymer is a polyester or copolyester, and even more preferably a PET or a copolymer thereof (e.g., a coPET formed using one or more comonomers such as, e.g., isophthalic acid).

The OS composition of the present invention can include any suitable amount of the polymer. When present, the polymer typically comprises at least about 1% by weight of the OS composition. In some embodiments, the polymer comprises at least 5% by weight, at least 10% by weight, at least 20% by weight, or at least 50% by weight of the OS composition. In some embodiments, the polymer comprises less than about 100% by weight, less than 99% by weight, less than 90% by weight, or less than 75% by weight of the OS composition.

In some embodiments, the oxygen-scavenging component may also include one or more additional reactive functional groups for purposes of incorporating the oxygen-scavenging component into the polymer. Thus, in some embodiments, the oxygen-scavenging component is a functionalized oxygen-scavenging component having at least one, and in some embodiments two or more, reactive functional groups capable of reacting with a complimentary reactive functional group to covalently incorporate the oxygen-scavenging component into the polymer or a precursor thereof. Examples of such groups include hydroxyl (—OH), carboxylic (—COOH), isocyanate (—NCO), oxirane, amino, mercaptan (—SH), and carbon-carbon double bonds (e.g., vinylic double bonds).

For example, in some embodiments the oxygen-scavenging component group may be incorporated into a backbone of the polymer through a pair of step-growth linkages (e.g., amide, ester, ether, carbonate ester, thiol, urea, or urethane) or a pair of addition linkages (e.g., hydrocarbon linkages formed via free-radical addition reactions). Alternatively, in some embodiments, a single reactive functional group may be used to incorporate the oxygen-scavenging component into the polymer, for example, as a terminal backbone group or in pendant group attached to the backbone.

The OS composition may also optionally include one or more additional oxygen-scavenging groups (in addition to the —CH(R$^1$)$_2$ groups). Suitable such other groups may include acyclic, mono-cyclic, or poly-cyclic unsaturated groups (e.g., polyolefin segments such as polybutadiene segments or the like; unsaturated bridged bicyclic groups such as, e.g., norbornene groups; unsaturated fatty acid groups; non-aromatic unsaturated cyclic groups such as, e.g., substituted or unsubstituted unsaturated $C_5$-$C_7$ rings; etc.), oxygen-scavenging amide groups (e.g., groups formed via polymerization of adipic acid and metaxylene diamine such as are present in MXD-6 polyamides commercially available from Mitsubishi), any other suitable oxygen-scavenging groups, or any combination thereof. While not wishing to be bound by any theory, the inclusion of two or more different types of oxygen-scavenging groups in the composition may allow for the design of an oxygen-scavenging composition having a unique oxygen-scavenging kinetics. For a discussion of such topics, see, for example, Share et al., U.S. Pat. No. 8,308,976.

As also indicated above, the OS composition also preferably includes a catalyst to enhance the oxygen-scavenging properties of the composition. The catalyst is preferably an oxidation catalyst capable of enhancing the oxygen-scavenging properties of the oxygen-scavenging component. While not wishing to be bound by any theory, the oxidation catalyst is believed to assist in activating the —CH(R1)$_2$ group of the oxygen-scavenging component to facilitate a reaction with oxygen.

A broad variety of metallic and organic compounds may be useful in catalyzing the oxygen-scavenging effect, and an appropriate compound may be selected based on any of cost, compatibility with the oxygen-scavenging component, compatibility with other polymers or ingredients in the composition, and compatibility with other layers in a multi-layered article. Examples of suitable oxidation catalysts include transition metals, complexes of transition metals, photoinitiators and the like, and mixtures thereof.

Examples of suitable oxidation catalysts include transition metals such as cobalt, iron, nickel, aluminum, ruthenium, rhodium, palladium, antimony, osmium, iridium, platinum, copper, manganese, and zinc, as well as oxides, salts or complexes of these metals, and mixtures thereof. For example, cobalt II salts of short chain acids such as acetic acid or terephthalic acid, or long chain acids such as neodecanoic, stearic, 2-ethyl hexanoic, or octenyl succinic acid may be used. Salts of inorganic acids may also be used. For example, antimony chloride III, antimony chloride V, and cobalt chloride may be used. Preferred oxidation catalysts include salts of cobalt and long chain acids such as, for example, cobalt acetate, cobalt neodecanoate, cobalt stearate, cobalt octoate, and mixtures thereof.

Preferred catalysts also include metal-containing catalysts such as those described in US2005/0032662, which is incorporated herein by reference in its entirety. A presently preferred catalyst is the catalyst sold under the tradename FeONIX, which is commercially available from Rahu Catalytics Limited of London, England. According to the manufacture's publicly-accessible literature, the FeONIX catalyst is a complex of a transition metal (specifically iron present as $FeCl_2 \cdot H_2O$) and a specific ligand of the above Formula 8 having the below Formula 9:

Formula 9 where $R^9$ is selected from a methyl group, —$C_8H_{17}$, —$C_{12}H_{25}$, and —$C_{18}H_{37}$; and Z is selected from groups as depicted by Formulas 10 and 11:

Formula 10

Formula 11

Other catalysts suitable for use in compositions of the present invention include iron and manganese-containing catalysts commercially available under the STEEL and DRAGON A350 tradenames from Rahu Catalytics Limited of London, England; and those disclosed in U.S. Publication No. 2012/0070554, the disclosure of which is incorporated by reference in its entirety.

When included in the OS composition, the oxidation catalyst is preferably present in an amount sufficient to catalyze the oxygen-scavenging ability of the OS composition in the end use application. The amount used will depend partially upon the catalyst chosen, as well as a variety of other factors such as, for example, the oxygen-scavenging component. In general, however, when using transition metal catalysts or complexes (e.g., in a monolayer article or in a layer of a multilayer article), the concentration may suitably be greater than about 10 part per million ("ppm") by weight, preferably greater than about 25 ppm by weight, and more preferably greater than about 35 ppm by weight, based on the total amount of transitional metal in the catalyst or complex relative to the total weight of the OS composition.

The amount of transition metal catalyst or complex present in the end use application may suitably be less than about 10,000 ppm by weight, preferably less than about 1,000 ppm by weight, and more preferably less than about 600 ppm by weight, based on the total amount of transition metal in the catalyst or complex relative to the total weight of the OS composition.

The amount of oxidation catalyst present in certain OS compositions of the present invention may be outside the ranges specified above in certain situations. For example, if the OS composition is to be diluted with additional material prior to forming a layer incorporating the OS composition, then an increased amount of catalyst will typically be included in the OS composition to compensate for dilution. Thus, for example, in an embodiment where the OS composition is to be diluted twenty-fold in an end use layer, the OS composition preferably has a catalyst concentration that is about twenty times higher than the catalyst concentration desired in the end use layer.

Moreover, depending upon the approach employed in such embodiments, portions of the OS composition may have even higher concentrations of catalyst than that of the overall blend. For example, in some embodiments where the OS composition is a blend of two or more different types of particles, all or substantially all of the catalyst may be introduced into the blend through incorporation of a catalyst concentrate particle into the blend.

In general, any suitable material can be added to the OS composition of the present invention that produces a desired result. For example, fillers, processing aids, plasticizers, fire retardants, anti-fog agents, crystallization aids, impact modifiers, surface lubricants, denesting agents, stabilizers, antioxidants, ultraviolet light absorbing agents, catalyst deactivators, colorants, nucleating agents, acetaldehyde reducing compounds, reheat enhancing aids, fillers, anti-abrasion additives, and the like, and combinations thereof can be included. In one embodiment, the OS composition includes the oxygen-scavenging component described herein, an oxidation catalyst, an additional polymer (e.g., a thermoplastic or base polymer), and a colorant.

The OS composition of the present invention is particularly useful in oxygen-scavenging layers (also referred to as "oxygen barrier layers") of packaging articles, such as layer 12 of article 10 shown in FIGS. 1-4. Packaging articles incorporating the OS composition of the present invention can be used to package any product for which it is desirable to inhibit exposure to oxygen during storage. Examples of packaging articles include bottles (including bottle crowns, caps, and other closures), cups, bowls, cartons (including, e.g., paperboard or fiberboard cartons), containers, films, wraps (including, e.g., meat wraps), liners (e.g., crown, cap, or closure liners), coatings, trays, and flexible bags for industrial, commercial, medical, or residential use.

The packaging articles may be rigid or flexible based on, for example, the number and type(s) of layers, the method of formation of the packaging article, and other relevant parameters. The articles may be formed by using the OS composition alone, by using a blend of the OS composition with one or more other polymers or materials, or by using a multi-layer construction incorporating one or more layers including the OS composition (e.g., as shown in FIGS. 2-4).

Additionally, the OS composition may be used as a coating, as a lining, or as part of a blend for a coating or lining of another article, such as a can, bottle, or container coating or lining. In some embodiments, the OS composition may be applied (either directly or via one or more intermediate layers) to a substrate such as a metal, plastic, fiberboard, or paperboard substrate.

If desired, the OS composition (which, in some embodiments, is the oxygen-scavenging component alone and/or in combination with an oxidation catalyst) may be dissolved in a suitable solvent to form a coating solution or may be blended with water and/or a suitable organic solvent to form a coating dispersion. The coating solution or dispersion may be applied using any suitable method, including, for example, spraying the coating solution or dispersion onto a surface of an article and drying the coating to form an oxygen-scavenging coating.

If desired, the coating solution or dispersion may be applied between layers of another suitable material to form an oxygen-scavenging film. Alternatively, the OS composition may be blended with a compatible polymer to form an oxygen-scavenging article, or may be used as an oxygen-scavenging layer in a multi-layered package construction.

Packaging articles incorporating OS composition of the present invention (e.g., article 10) can be of any desired construction. The packaging articles can be formed from multiple layers of material (referred to as "multilayer" articles, such as articles 10 shown in FIGS. 1-4) or a single layer of material (referred to as "monolayer" articles). The packaging articles can include a single structural layer or a structural layer and one or more additional layers. The one or more additional layers can be, for example, a gas barrier layer (e.g., a layer incorporating a passive barrier material such as an ethylene-vinyl alcohol copolymer ("EVOH")), an oxygen-scavenging layer, a food-contact layer, a structural layer, an adhesive layer, or any layer that combines one or more of these, alone or in any combination.

Multilayer packaging articles are typically prepared using coextrusion, injection molding, injection blow molding, stretch blow molding, coating, or lamination, among other techniques. Monolayer packaging articles are typically prepared by solvent casting, injection molding, blow molding, or by extrusion, among other techniques. A monolayer article is an article formed of substantially the same composition throughout (e.g., a homogenous or substantially homogenous blend).

A multilayer article may be produced that includes the OS composition in one or more layers. In some embodiments, a multilayer article may benefit from (i) placing one or more layers 16 of another material between the atmosphere and layer 12 of the OS composition and/or (ii) placing one or more layers 18 of another material between surface 14 and layer 12 of the OS composition (e.g., as shown in FIGS. 2-4). An outer layer 16 of one or more layers may, for example, protect the OS composition from physical damage and assist in blocking or reducing migration of oxygen through a wall of the article. In such constructions, the OS composition will preferably scavenge any oxygen that penetrates the one or more layers 16 located between the atmosphere and the OS composition. In addition, the OS composition is also preferably capable of scavenging oxygen that may be present inside a packaged product or within a headspace of the packaging article (if present).

The OS composition of the present invention may be deployed neat to form an oxygen-scavenging layer of a monolayer or multilayer packaging article. Or, alternatively, prior to formation of the oxygen-scavenging layer of the packaging article, it can be blended (e.g., in the feedthroat of an extruder prior to article formation) with one more additional polymers or additives, which may, for example, reduce transportation and storage costs and/or help preserve the oxygen-scavenging capacity of the OS composition.

Articles of the present invention (e.g., articles 10, shown in FIGS. 1-4) can include any suitable amount of oxygen-scavenging component of the OS composition. The amount of oxygen-scavenging component included in such articles may vary depending upon a variety of considerations such as, for example, the desired oxygen-scavenging properties of the article, the efficacy of the oxygen-scavenging component, cost, and the desired article properties.

In preferred embodiments, monolayer or multilayer articles of the invention preferably include at least about 0.1% by weight, more preferably at least about 0.5% by weight, and even more preferably at least about 1.0% by weight of the oxygen-scavenging component, based on the total weight of the monolayer or multilayer article. In some embodiments, a monolayer or multilayer article may include less than about 15% by weight, less than about 10% by weight, or less than about 5% by weight of the oxygen-scavenging component, based on the total weight of the monolayer or multilayer article.

The above weight percentages refer to the total weight of the ingredient including the oxygen-scavenging component. Therefore, in embodiments where the thermoplastic or base polymer includes the oxygen-scavenging component, it refers to the total weight of the thermoplastic polymer relative to the total weight of the monolayer or multilayer article. Nonetheless, it is contemplated that the oxygen-scavenging component may constitute, on a weight basis, all or substantially all of the material of the packaging article if desired. For example, in some embodiments, the oxygen-scavenging component may be present on a thermoplastic polymer (e.g., a structural polymer) of the article.

Articles containing the OS composition of the present invention are preferably storage stable for a prolonged period of time (e.g., at least days, weeks, or months) under normal atmospheric conditions (e.g., ambient temperature, ambient humidity, and/or atmospheric air) without exhibiting unsuitable degradation in oxygen-scavenging properties, thereby avoiding costly storage techniques (e.g., storage under nitrogen gas, refrigeration, dessication, etc.) frequently associated with certain oxygen-scavenging articles.

In some embodiments, to preserve oxygen-scavenging capacity, the oxygen-scavenging component is combined with oxidation catalyst just prior to, or during, formation of an oxygen-scavenging layer of a packaging article (e.g., kept separate and then combined in a feedthroat of an extruder). Alternatively, the oxygen-scavenging component and the oxidation catalyst are present in different pellets of a multi-pellet blend, such that they don't come into intimate contact with each other until the blend is melt-blended in an extruder just prior to article formation. Such a timing of oxidation catalyst addition may result in enhanced storage stability for oxygen-scavenging components and/or compositions of the invention prior to article formation.

Monolayer and multilayer articles of the present invention may be formed from the OS composition of the present invention using any suitable method. Examples of suitable methods include extrusion processes (including, e.g., co-extrusion), lamination processes, injection processes (including, e.g., co-injection), application of liquid coating compositions to at least a portion of a substrate, or a combination thereof. One or more precursor or intermediate articles, such as for example a preform, may be formed in route to the finished article.

In certain embodiments, to facilitate incorporation of the OS composition of the present invention into an article, solid thermoplastic particles (e.g., pellets, flakes, powder, etc.) are formed which include the oxygen-scavenging component described herein. Such thermoplastic particles may be formed, for example, by melt blending the oxygen-scavenging component (which may be a polymer) with a thermoplastic polymer and/or an oxidation catalyst and pelletizing the resulting blend. In some embodiments, substantially all, or even all, of the weight of the thermoplastic particles comprises one or more thermoplastic polymer(s) including the oxygen-scavenging component as a portion thereof. In some embodiments, the oxidation catalyst and the oxygen-scavenging component are present in different pellets to avoid premature activation of the oxygen-scavenging component.

In one method, a multilayered article (e.g., a container or film) is prepared by: (i) providing a barrier layer blend material including, or consisting of, the OS composition of the present invention; (ii) providing one or more inner layer materials of suitable formable polymer and one or more outer layer materials of suitable formable polymer; and (iii) co-injecting the barrier layer blend material and the one or more inner layer materials and one or more outer layer materials to form a multilayered article (which may optionally be a perform). In the case of a multilayered article such as, for example a container, the method may also optionally include the step of (iv) heating and expanding a perform resulting from (iii) to form the article.

In an alternative method, a multilayered article (e.g., a container) is prepared by: (i) providing a barrier layer blend material including, or consisting of, the OS composition of the present invention; (ii) providing one or more inner layer materials of suitable thermoplastic polymer(s) and one or more outer layer materials of suitable thermoplastic polymer(s); (iii) extruding a multilayer parison tube having one or more inner layers and one or more outer layers of suitable thermoplastic polymer(s) and the barrier layer blend material; (iv) clamping the parison tube into a hollow cavity mold; (v) blowing the parison against the cavity; and (vi) trimming the molded article.

In yet an alternative method (the "over-injected parison" method), a multilayered article (e.g., a container) is prepared by: (i) providing a barrier layer blend material including, or consisting of, the OS composition of the present invention; (ii) providing one or more inner and one or more outer layer materials of suitable thermoplastic polymer(s); (iii) extruding a multilayer parison tube having one or more inner layers and one or more outer layers of a suitable thermoplastic polymer(s) and the barrier layer blend material; (iv) injecting one or more additional layers of polymer over the parison; (v) clamping the over-injected parison tube into a hollow cavity mold; (vi) blowing the over-injected parison against the cavity; and (vii) optionally trimming the molded container.

In yet another method (called "IOI"), a multilayered article (e.g., a container) is prepared by: (i) providing the OS composition of the present invention; (ii) injecting the OS composition to form a preform; (iii) injecting a layer of thermoplastic polymer(s) against the preform (e.g., on the outside surface); and (iv) heating and expanding the preform to form an article.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Test samples of Examples 1 and 2 were prepared and tested for oxygen scavenging performance. For the test samples of Example 1, which did not include an oxygen catalyst, a film was cast from a toluene solution containing 1.0 gram of a 350,000 weight-average molecular weight polymethylmethacrylate (PMMA) polymer (obtained from Sigma-Aldrich, St. Louis, Mo.), and 50.0 milligrams of a Troger's base oxygen-scavenging component (obtained from Sigma-Aldrich, St. Louis, Mo.).

The test sample of Example 2 included the same PMMA polymer and Troger's base oxygen-scavenging component, and also include 100 ppm of an oxygen catalyst commercially available under the STEEL tradename from Rahu Catalytics Limited of London, England. Each film was then cut into pieces, placed into a 50-milliliter flask filled with distilled water, and fitted with a ground glass stopper and an oxygen sensor commercially available under the OXY-SENSE OXYDOT tradename from OxySense, Inc., Dallas, Tex.

Prior to the testing, the oxygen concentration of the distilled water in both flasks was measured to obtain a baseline oxygen concentration of 9,297 parts-per-billion (ppb) dissolved in the water. The test samples of Examples 1 and 2 were then left in the sealed flasks for 19 days at 25° C. The resulting water in each flask was then re-measured for oxygen concentrations. The water with the non-catalyzed film of Example 1 still had 8,346 ppb of dissolved oxygen in the water. In comparison, the catalyzed film of Example 2 only contained 1,927 ppb of dissolved oxygen in the water. While not wishing to be bound by theory, it is believed that the combination of the Troger's base oxygen-scavenging compound in the test sample of Example 2, having a pair of aromatic rings, —$CH_3$ groups attached to the aromatic rings, and electron-donating groups also attached to the aromatic rings, assisted the catalyst in scavenging oxygen from the water, reducing the oxygen concentration in the water by more than a factor of four compared to the non-catalyzed test sample of Example 1.

The test samples of Examples 1 and 2, as well as a test sample of Example 3, were also tested for oxygen scavenging performance using Attenuated Total Reflectance-Fourier transform infrared (ATR-FTIR) spectroscopy, where each test sample was measured at 25° C. and at 60° C. The test sample of Example 3 was similar to the test sample of Example 2, but included 100 ppm of a cobalt-containing oxygen catalyst.

Figure 5:
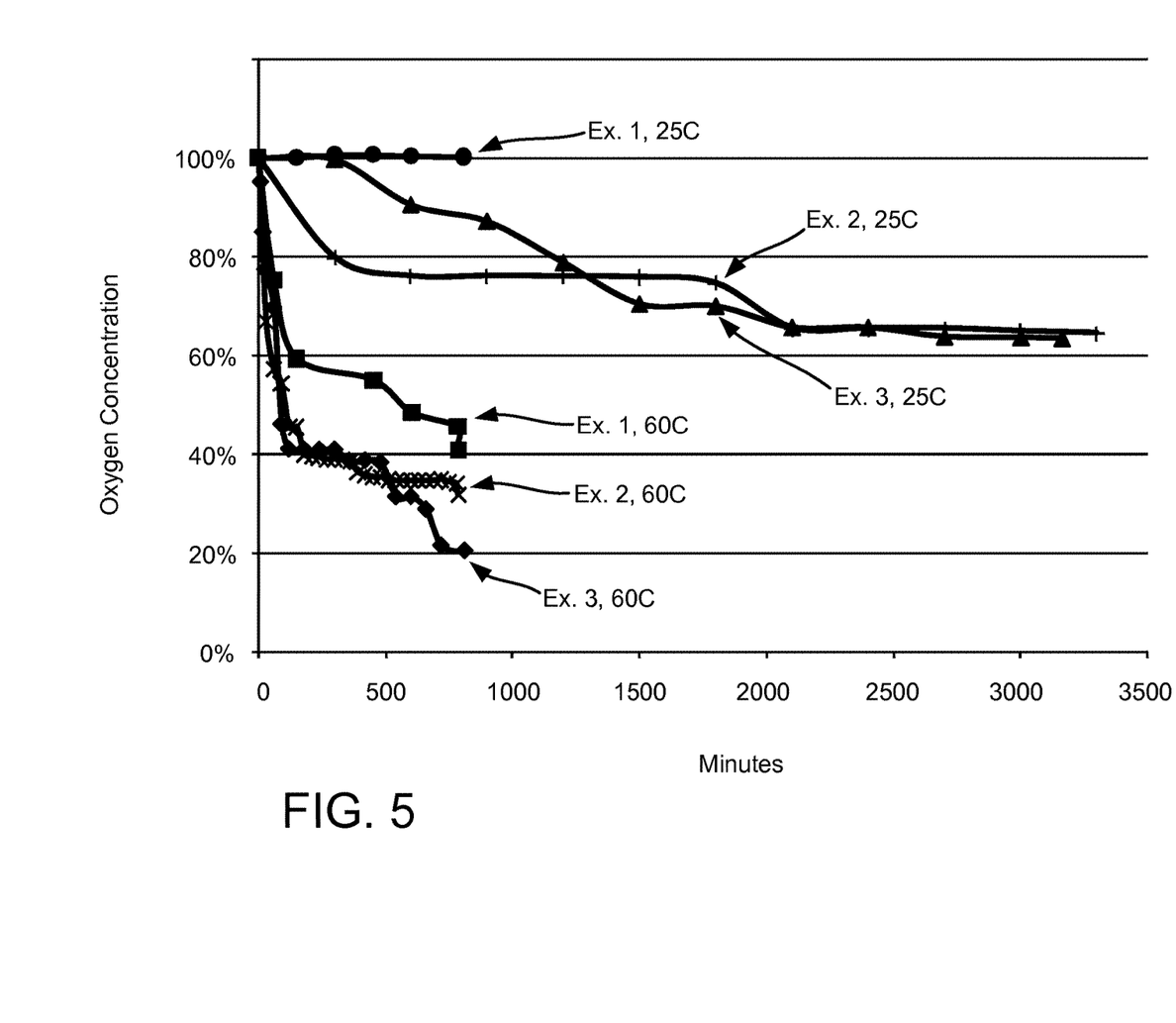
FIG. 5 is a graphical illustration of Attenuated Total Reflectance—Fourier transform infrared (ATR-FTIR) spectroscopy test result for Example test samples.

For each test sample of Examples 1-3, the test sample was applied to an ATR-FTIR temperature controlled cell, and the oxidation rate of the scavenger was measured by following the disappearance of the reactant and the appearance of aldehydes and carboxylates in the infrared spectrum. FIG. 5 depicts the test results for Examples 1-3 at 25° C. and at 60° C., illustrating the different oxygen scavenging capabilities relative to the varying temperatures and catalytic conditions. As shown, the test samples of Examples 2 and 3 had increased oxygen scavenging capabilities compared to those of the test samples of Example 1.

As discussed above, this is believed to be due to the combination of the Troger's base oxygen-scavenging compound and the oxygen catalyst in the test sample of Examples 2 and 3. Furthermore, it shown that the Troger's base oxygen-scavenging compound may function in combination with different types of oxygen catalysts, and that the oxygen scavenging capabilities increase with temperature.

Although the present invention has been described with reference to preferred embodiments, workers skilled in the art will recognize that changes may be made in form and detail without departing from the spirit and scope of the invention.

The invention claimed is:

1. A packaging article comprising a layer of an oxygen-scavenging composition, wherein the oxygen-scavenging composition comprises:
   a thermoplastic polymer;
   an oxidation catalyst; and
   an oxygen-scavenging component, wherein the oxygen scavenging component absorbs, consumes or reduces the amount of oxygen from an environment within the packaging article, the oxygen scavenging component comprising:
   a first aromatic ring;
   a —$CH(R^1)_2$ group attached to a first atom of the aromatic ring, wherein each $R^1$ is independently a hydrogen atom, a halogen atom, a hydroxyl group, a mercaptan group, or an organic group; and
   a π donor electron-donating group attached to a second atom of the aromatic ring at an ortho position or a para position relative to the —$CH(R^1)_2$ group, wherein the π donor electron-donating group is selected from —NHR, and $NHCOCH_3$, and wherein R is an alkyl group; and
   a second aromatic ring;
   a second —$CH(R^1)_2$ group attached to the second aromatic ring; and
   a second π donor electron-donating group attached to the second aromatic ring at an ortho position or a para position relative to the second —$CH(R^1)_2$ group;
   wherein the first and second aromatic rings are covalently attached to one another either directly or indirectly via one or more substituent groups.

2. The packaging article of claim 1, wherein the first aromatic ring comprises a six-member carbon ring.

3. The packaging article of claim 1, and further comprising a packaging article surface, wherein the layer of the oxygen-scavenging composition is disposed on the packaging article surface.

4. The packaging article of claim 1, wherein the oxygen-scavenging component has a number average atomic weight of less than 500 Daltons.

5. The packaging article of claim 1, wherein the oxygen-scavenging component is present in at least one of:
   a backbone of the thermoplastic polymer, or
   in a pendant group attached to the backbone of the thermoplastic polymer.

6. The packaging article of claim 1, wherein the thermoplastic polymer comprises a polyolefin, a polyester, or a copolymer thereof.

7. The packaging article of claim 1, wherein the oxygen-scavenging composition includes at least 10 ppm of the oxidation catalyst.

8. The packaging article of claim 1, wherein the oxidation catalyst comprises one or more transition metals, transition metal complexes, or mixtures thereof.

9. The packaging article of claim 1, wherein the second π donor electron-donating group is selected from —NHR, —$NHR_2$, —OH, —OR and $NHCOCH_3$, and wherein R is an alkyl group.

10. The packaging article of claim 1, wherein each $R^1$ in the second —$CH(R^1)_2$ group is independently selected from a hydrogen atom or a substituted or unsubstituted hydrocarbon group.

11. The packaging article of claim 10, wherein one or both $R^1$ in the second —$CH(R^1)_2$ group is a hydrogen atom.

* * * * *